(12) United States Patent
Yonemoto et al.

(10) Patent No.: US 11,131,800 B2
(45) Date of Patent: Sep. 28, 2021

(54) BACKLIGHT UNIT AND LIQUID CRYSTAL DISPLAY DEVICE

(71) Applicant: FUJIFILM CORPORATION, Tokyo (JP)

(72) Inventors: Takashi Yonemoto, Kanagawa (JP); Hirofumi Toyama, Kanagawa (JP); Naoyoshi Yamada, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/925,305

(22) Filed: Jul. 9, 2020

(65) Prior Publication Data

US 2020/0341183 A1    Oct. 29, 2020

Related U.S. Application Data

(63) Continuation of application No. PCT/JP2018/044094, filed on Nov. 29, 2018.

(30) Foreign Application Priority Data

Jan. 12, 2018    (JP) .............................. JP2018-003380

(51) Int. Cl.
*F21V 8/00*     (2006.01)
*G02F 1/13357*  (2006.01)
*G02F 1/1335*   (2006.01)

(52) U.S. Cl.
CPC ........... *G02B 6/0061* (2013.01); *G02B 6/002* (2013.01); *G02B 6/0036* (2013.01);
(Continued)

(58) Field of Classification Search
CPC .... G02B 6/0061; G02B 6/002; G02B 6/0036; G02B 6/0051
See application file for complete search history.

(56) References Cited

U.S. PATENT DOCUMENTS 6,608,614 B1 * 8/2003 Johnson ................. H05B 45/20
345/102
2009/0128735 A1 * 5/2009 Larson ................. G02B 6/0021
349/62
(Continued)

FOREIGN PATENT DOCUMENTS

JP           4106876 B2    6/2008
JP        2009-175702 A    8/2009
(Continued)

OTHER PUBLICATIONS

International Search Report issued in International Application No. PCT/JP2018/044094 dated Feb. 19, 2019.
(Continued)

*Primary Examiner* — Evan P Dzierzynski
(74) *Attorney, Agent, or Firm* — Solaris Intellectual Property Group, PLLC

(57) ABSTRACT

The backlight unit includes: a light guide that includes an incidence surface and an emission surface facing each other; and a light source portion including a plurality of point light sources that are two-dimensionally arranged to face the incidence surface of the light guide, in which light emitted from the light source portion is incident into the incidence surface of the light guide and emitted from the emission surface, the backlight unit is driven by local dimming in which at least two point light sources among the plurality of point light sources are used as a minimum point lighting unit, the light guide includes a plurality of light advancing direction conversion portions and a plurality of light extraction portions, each of the light advancing direction conversion portions is provided at each of positions on the incidence surface facing the plurality of point light sources and changes an advancing direction of each of light components to a direction in which the light component is guided in the light guide, and each of the light extraction portions is provided per unit region corresponding to the minimum point lighting unit in a state where a density in a peripheral (Continued)

portion of the unit region is set to be higher than a density in a center portion of the unit region and emits the light guided in the light guide.

10 Claims, 6 Drawing Sheets

(52) U.S. Cl.
CPC ......... *G02B 6/0051* (2013.01); *G02B 6/0055* (2013.01); *G02F 1/1336* (2013.01); *G02F 1/133601* (2021.01)

(56) References Cited

U.S. PATENT DOCUMENTS

| | | |
|---|---|---|
| 2010/0302135 A1 | 12/2010 | Larson et al. |
| 2012/0013811 A1 | 1/2012 | Shimizu |
| 2012/0099048 A1 | 4/2012 | Yamazaki et al. |
| 2015/0359067 A1 | 12/2015 | Kurita et al. |
| 2016/0218258 A1 | 7/2016 | Yamazaki et al. |
| 2020/0341183 A1* | 10/2020 | Yonemoto ......... G02F 1/133607 |

FOREIGN PATENT DOCUMENTS

| | | |
|---|---|---|
| JP | 2014-146419 A | 8/2014 |
| JP | 2016-12552 A | 1/2016 |
| JP | 2007-5111 A | 1/2017 |
| JP | 2017-168851 A | 9/2017 |
| WO | 2010/113361 A1 | 10/2010 |

OTHER PUBLICATIONS

Written Opinion of the ISA issued in International Application No. PCT/JP2018/044094 dated Feb. 19, 2019.

* cited by examiner

BACKLIGHT UNIT AND LIQUID CRYSTAL DISPLAY DEVICE

CROSS-REFERENCE TO RELATED APPLICATIONS

This application is a continuation application of International Application No. PCT/JP2018/044094, filed Nov. 29, 2018, the disclosure of which is incorporated herein by reference in its entirety. Further, this application claims priority from Japanese Patent Application No. 2018-003380, filed Jan. 12, 2018, the disclosure of which is incorporated herein by reference in its entirety.

BACKGROUND OF THE INVENTION

1. Field of the Invention

The present disclosure relates to a planar lighting device and a liquid crystal display device including the planar lighting device.

2. Description of the Related Art

A liquid crystal display device (LCD) has been more widely used as a space-saving image display device having low power consumption. For example, the liquid crystal display device has a configuration in which a backlight unit, a backlight-side polarizing plate, a liquid crystal panel, a visible-side polarizing plate, and the like are provided in this order.

As the backlight unit, for example, an edge light mode (also referred to as "side light mode") and a direct backlight mode are known, the edge light mode including a light guide plate and a light source that is arranged on an edge surface of the light guide plate, in which light incident from the light source into the edge surface is guided and emitted from the entire main surface to a liquid crystal panel, and the direct backlight mode having a structure in which a light source is arranged immediately below a liquid crystal panel without using a light guide plate and light is emitted to a liquid crystal panel from the entire main surface of a light diffusion plate provided on the light source.

In order to improve the image quality of a LCD, a backlight unit capable of local dimming is required. As the edge light mode backlight unit, a backlight unit having a configuration in which a plurality of light guide plates are arranged to realize dimming is disclosed. The thickness of this backlight unit can be made to be 10 mm or less. On the other hand, the edge light mode backlight unit has a problem in that the division number cannot increase. On the other hand, in a direct backlight unit in the related art, by using a plurality of point light sources as a light source, dimming of the number of point light sources can be performed.

However, the thickness of the direct backlight unit in the related art is not likely to be reduced and is 15 mm or more. A light diffusion plate provided in a direct backlight unit is arranged in order to diffuse light emitted from a light source such that brightness unevenness of emitted light in a plane (inhomogeneity of in-plane brightness) is reduced. Recently, along with demands for reduction in power and size, a light emitting diode (LED) element has been mainly used as a light source. This LED element has strong directivity. Therefore, in the case of a direct backlight mode, a region immediately above a LED element becomes very bright, which causes significant brightness unevenness. The reason why it is difficult to reduce the thickness of a direct backlight unit is that, in order to obtain irradiation light having a small brightness unevenness in the entire light emission surface, a light diffusion plate and a LED element needs to be sufficiently spaced from each other with a sufficient distance.

JP2014-146419A (hereinafter, referred to as "PTL 1") discloses a configuration in which light emitted from a point light source is homogenized and emitted by arranging a substrate on the point light source, the substrate including an opening such that the opening is not provided in a predetermined range from a point on an optical axis of the point light source and a transmittance increases in a direction away from the point on the optical axis of the point light source.

In addition, JP4106876B (hereinafter, referred to as "PTL 2") discloses a light emitting device including a light guide plate that is provided on a LED element and includes a recess in which an inclined portion is formed to gradually spread toward an upper surface. As a result, light emitted from the LED element rapidly spreads in a horizontal direction to be homogenized and is emitted from the upper surface of the light guide plate.

SUMMARY OF THE INVENTION

In the technique of the related art disclosed in PTL 1, PTL2, or the like, a method in which light emitted from a LED element is homogenized and emitted in the vicinity of the LED element is disclosed instead of directly emitting light from one LED element.

On the other hand, in order to reduce the size of a direct backlight unit, as a point light source, the use of a LED element having a smaller size than that of the related art, that is, a so-called mini LED or micro LED element is also considered.

In order to reduce the thickness of a direct backlight unit, it is also considered to combine the micro LED element with the light homogenization technique disclosed in PTL 1, PTL2, or the like. However, according to an investigation by the present inventors, it was found that there is a difference between individual micro LED elements and there is a variation between individual brightness values such that brightness unevenness may occur due to this individual difference.

The present disclosure has been made under the above-described circumstances, and an object thereof is to provide a direct backlight unit that can emit homogeneous illumination light with a small brightness unevenness and can be configured to be thin; and a liquid crystal display device.

According to the present disclosure, there is provided a backlight unit comprising: a light guide that includes an incidence surface and an emission surface facing each other; and a light source portion including a plurality of point light sources that are two-dimensionally arranged to face the incidence surface of the light guide, in which light emitted from the light source portion is incident into the incidence surface of the light guide and emitted from the emission surface, the backlight unit is driven by local dimming in which two or more point light sources among the plurality of point light sources are used as a minimum point lighting unit.

The light guide includes a plurality of light advancing direction conversion portions and a plurality of light extraction portions, each of the light advancing direction conversion portions is provided at each of positions on the incidence surface facing the plurality of point light sources and changes an advancing direction of each of light components to a direction in which the light component is guided in the light guide, and each of the light extraction portions is provided per unit region corresponding to the minimum point lighting unit in a state where a density in a peripheral portion of the unit region is set to be higher than a density in a center portion of the unit region and emits the light guided in the light guide.

In the backlight unit according to the present disclosure, it is preferable that, in a case where one point light source among the plurality of point light sources is lighted, a light extraction efficiency in a near-field region of the point light source is lower than 50%.

In the backlight unit according to the present disclosure, it is preferable that, in a case where one point light source among the plurality of point light sources is lighted, a light extraction efficiency in the unit region including the point light source is 70% or higher.

In the backlight unit according to the present disclosure, it is preferable that, in the center portion of the unit region of the light guide, the light extraction portions are provided at a higher density in a region corresponding to a portion where the arrangement of the point light sources is sparse than that in a region corresponding to a portion where the arrangement of the point light sources is dense.

In the backlight unit according to the present disclosure, it is preferable that the plurality of point light sources are arranged in the unit region in a two-dimensional lattice.

Here, "arranged in a two-dimensional lattice" represents that the point light sources are arranged at lattice points of a two-dimensional lattice.

In the backlight unit according to the present disclosure, it is preferable that a density distribution of the light extraction portions has a maximum value at an intersection of diagonal lines of the plurality of point light sources arranged in the two-dimensional lattice in the center portion of the unit region of the light guide.

In the backlight unit according to the present disclosure, the light advancing direction conversion portion may include a concave portion having a surface that is not parallel to the emission surface.

In the backlight unit according to the present disclosure, the light advancing direction conversion portion may include a concave portion having a hemispherical shape, a conical shape, or a polygonal pyramid shape that is provided on the incidence surface or the emission surface.

In a case where the light advancing direction conversion portion includes the concave portion, it is preferable that the concave portion is provided on the emission surface, and it is preferable that the concave portion has a shape that has a wide opening on the emission surface and is tapered toward the point light source facing the concave portion.

In the backlight unit according to the present disclosure, the light advancing direction conversion portion may include a through hole that penetrates the light advancing direction conversion portion from the incidence surface to the emission surface and a light reflection member, a light diffusion member, or a light absorption member that is arranged on the emission surface side of the through hole.

According to the present disclosure, there is provided a liquid crystal display device comprising: a liquid crystal display element; and the backlight unit according to the present disclosure.

The backlight unit according to the present disclosure includes the light guide having the above-described configuration. Therefore, although the backlight unit is a direct backlight mode, a thin shape can be realized, and homogeneous illumination light with a small brightness unevenness can be emitted.

DESCRIPTION OF THE PREFERRED EMBODIMENTS

Figure 1:
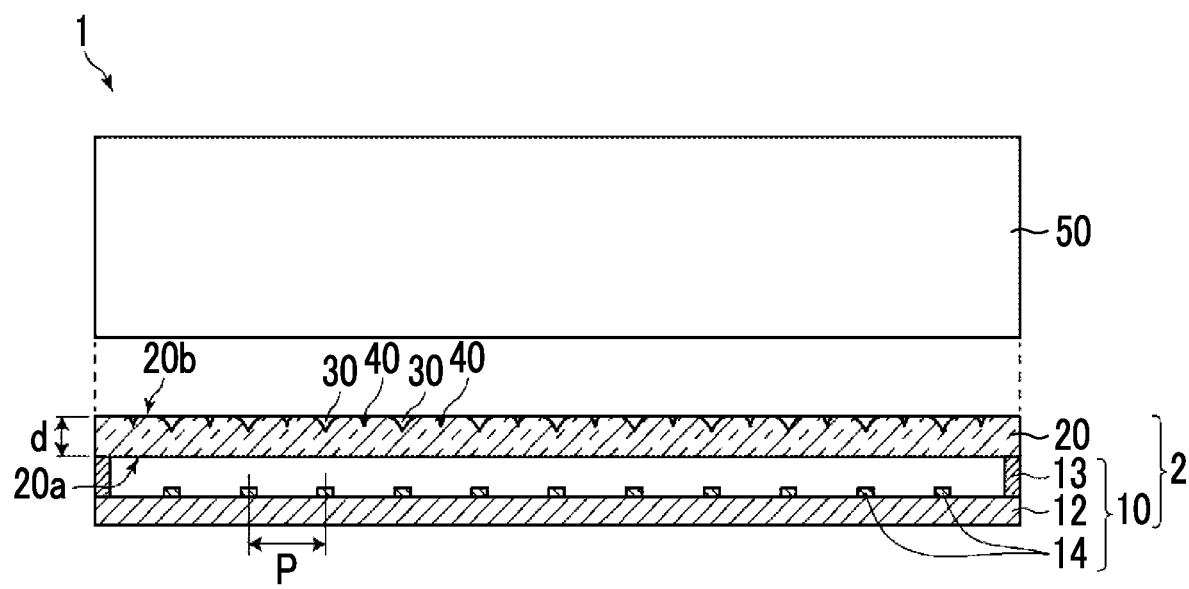
FIG. 1 is a schematic cross-sectional view illustrating a schematic configuration of a liquid crystal display device according to one embodiment of the present invention.

Hereinafter, an embodiment of the present invention will be described using the drawings, but the present invention is not limited thereto. For easy visual recognition, the reduced scale or the like of respective components in the drawing is different from the actual scale. In addition, in this specification, unless specified otherwise, numerical ranges represented by "to" include numerical values before and after "to" as lower limit values and upper limit values.

FIG. 1 is a cross-sectional view illustrating a schematic configuration of a liquid crystal display device 1 according to one embodiment of the present invention.

The liquid crystal display device 1 includes: a liquid crystal display element 50; and a backlight unit 2 according to one embodiment of the present invention that is arranged on a backlight incidence surface side of the liquid crystal display element 50.

The liquid crystal display element 50 includes a liquid crystal panel, a visible-side polarizing plate that is provided on a visible side of the liquid crystal panel, and a backlight-side polarizing plate that is provided on the backlight incidence surface side of the liquid crystal panel.

The backlight unit 2 includes: a light guide 20 that includes an incidence surface 20a and an emission surface facing each other 20b; and a light source portion 10 including a plurality of point light sources 14 that are two-dimensionally arranged to face the incidence surface 20a of the light guide 20. In the backlight unit 2, light emitted from the light source portion 10 is incident into the incidence surface 20a of the light guide 20, and the light that is homogenized by the light guide 20 is emitted from the emission surface 20b. In addition, the backlight unit 2 may include a prism sheet, a diffusion sheet, a phosphor sheet, and a brightness enhancement sheet (all of which are not illustrated) between the light guide 20 and the liquid crystal display element 50.

The backlight unit 2 can be driven by a local dimming method (hereinafter, referred to as "driven by local dimming") in which at least two point light sources 14 among the plurality of point light sources 14 are used as a minimum point lighting unit. In the case of a direct backlight unit, in general, the minimum unit of local dimming driving is one point light source. On the other hand, although the backlight unit according to the present disclosure is a direct backlight mode, two or more point light sources are used as a minimum point lighting unit of local dimming driving.

Hereinafter, each of the components of the backlight unit 2 will be described.

<Light Source Portion>

Figure 2:
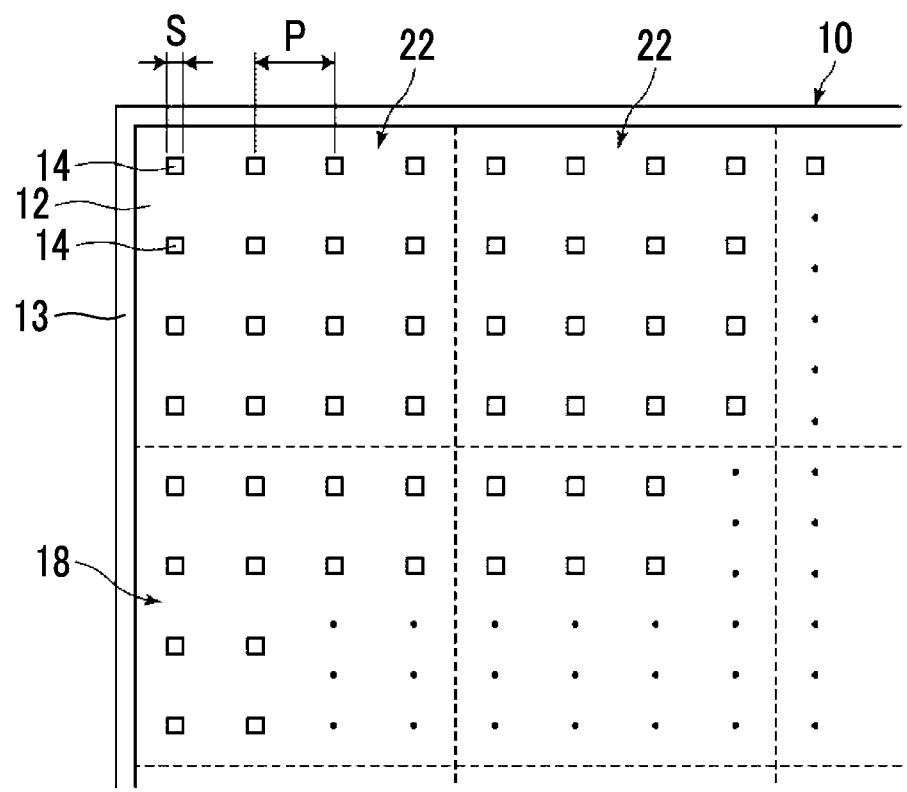
FIG. 2 is a schematic plan view illustrating a part of a light source portion of a backlight unit.

First, the light source portion 10 will be described with reference to FIGS. 1 and 2. FIG. 2 is a schematic plan view illustrating a part of the light source portion 10.

The light source portion 10 includes a reflection plate 12 on which the point light sources 14 are arranged. As illustrated in FIG. 2, the point light sources 14 are two-dimensionally arranged on the reflection plate 12. The light source portion 10 includes a side wall 13 that is provided at an edge of the reflection plate 12 and includes a reflecting surface on the inside.

In the present embodiment, in local dimming driving, for example, 16 (4×4) point light sources 14 in total per region indicated by a broken line illustrated in FIG. 2 are used as a minimum point lighting unit. The 16 point light sources 14 as the minimum point lighting unit are on-off driven at the same time. The number of the point light sources included in the minimum point lighting unit is not particularly limited as long as it is two or more, and may be appropriately set depending on the set size of one region in local dimming. In a plan view in which the backlight unit 2 is seen from the emission surface 20b side of the light guide 20, a region corresponding to the minimum point lighting unit is a unit region 22. The definition of the unit region 22 will be described below.

(Point Light Source)

The point light source 14 may be a LED or may be a laser light source. The laser light source is preferable from the viewpoints that color reproducibility can be improved and light can be more efficiently spread in an in-plane direction. In addition, as the point light source 14, a white light source may be used, or a plurality of light sources having different emission colors may be used. Further, the point light source 14 may be a monochromatic light source. In a case where the monochromatic light source is used, the backlight unit or the liquid crystal display element includes a member including a phosphor, in which white light or other desired emission color light can be obtained by performing wavelength conversion on light emitted from the monochromatic light source using the phosphor. For example, a LED that emits blue or ultraviolet light can be used as the point light source, and a quantum dot phosphor can be used as the phosphor. The number of point light sources is directly linked to the number of divided areas of local dimming. Therefore, in order to increase the number of divided areas, the number of point light sources may be increased. By using a point light source having a smaller size, the number thereof can be increased. As the point light source, a mini LED or micro LED having a size S of 1.0 mm or less, preferably 0.6 mm or less, and more preferably 0.15 mm or less is suitable.

(Arrangement of Point Light Sources)

The arrangement of the point light sources is suitably a lattice arrangement in which the point light sources are arranged in a two-dimensional lattice, but the present invention is not limited thereto. For example, the arrangement of the point light sources may be a triangular arrangement or a hexagonal arrangement. Here, "the lattice arrangement in which the point light sources are arranged in a two-dimensional lattice" refers to an arrangement in which a plurality of light source arrays each of which includes a plurality of point light sources arranged in one direction at a given pitch are arranged in a direction intersecting the one direction and the point light sources are positioned at lattice points of the two-dimensional lattice. In a case where the one direction and the intersecting direction are perpendicular to each other and the pitch of the point light source in the light source array and the arrangement pitch of the light source arrays are the same, the lattice is a square as illustrated in FIG. 2. In a case where the pitch of the point light source in the light source array and the arrangement pitch of the light source arrays are different, the lattice is a rectangle. In a case where the one direction and the intersecting direction are not perpendicular to each other, the lattice is a parallelogram. It is preferable that the point light sources are regularly arranged. However, within a range where the effects of the present invention can be obtained, the point light sources may be irregularly arranged. An interval P between point light sources closest to each other is preferably 2 mm to 20 mm. In a case where the point light sources are regularly arranged, the interval between the point light sources refers to the arrangement pitch.

The arrangement of the point light sources is preferably regular. In this case, the arrangement of the point light sources only has to be regular in each of the unit regions 22, and periods between adjacent unit regions may be discontinuous.

(Substrate for Arrangement of Point Light Source)

The substrate on which the point light sources 14 are arranged is not limited to the reflection plate. However, in order to increase the light use efficiency by further reflecting a light component reflected from the light guide 20 among light components emitted from the point light sources 14 to the light guide 20, it is preferable that the point light sources 14 are arranged on the reflection plate 12. The reflection plate 12 is not particularly limited, and various well-known reflection plates can be used. In order to effectively utilize light, it is preferable that the reflection plate 12 includes a reflecting surface having a small absorption and a high reflectivity. For example, it is preferable that the reflection plate 12 includes a reflecting surface including a multi-layer film that is formed of a white polyethylene terephthalate (PET) or a polyester resin, but the present invention is not limited thereto. Examples of the multi-layer film formed of a polyester resin include ESR (trade name, manufactured by 3M).

<Light Guide>

Figure 3:
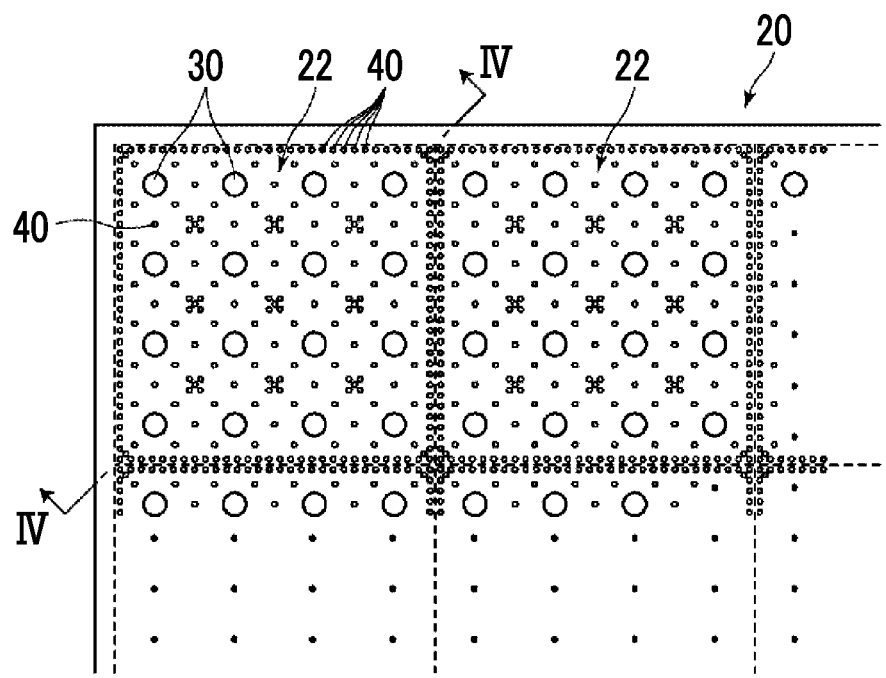
FIG. 3 is a schematic plan view illustrating a part of a light guide of the backlight unit.
Figure 4:
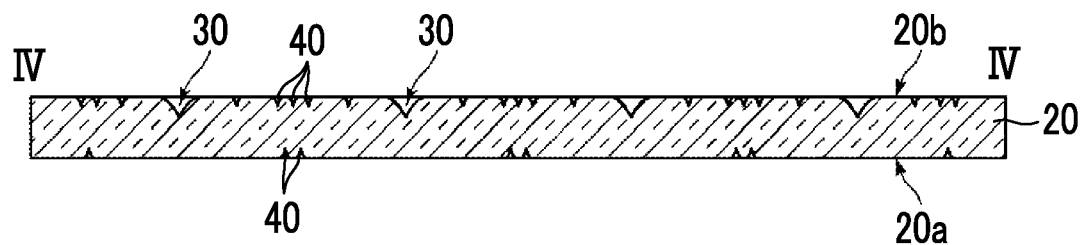
FIG. 4 is a cross-sectional view taken along line IV-IV of FIG. 3.

Next, the light guide 20 will be described with reference to FIGS. 1 to 4. FIG. 3 is a schematic plan view illustrating a part of the light guide 20. FIG. 4 is a cross-sectional view taken along line IV-IV of the light guide 20 illustrated in FIG. 3.

The light guide 20 is a surface-shaped member that homogenizes the brightness of light incident into the incidence surface 20a from the light source portion 10 and emits the light having the homogeneous brightness from the emission surface 20b.

(Material of Light Guide)

Examples of the light guide 20 include a light guide sheet that is formed of a resin having high transparency that is the same as that for forming a light guide plate used in a well-known backlight unit, for example, polyethylene terephthalate, polypropylene, polycarbonate, an acrylic resin such as polymethyl methacrylate, benzyl methacrylate, polymethacrylstyrene (MS resin), a cycloolefin polymer, a cycloolefin copolymer, or cellulose acylate such as cellulose diacetate or cellulose triacetate. The above-described resin is not limited to a thermoplastic resin and, for example, may be an ultraviolet curable resin, an ionizing radiation-curable resin such as an electron beam curable resin, or a thermosetting resin.

In addition, as the material of the light guide 20, glass may be used instead of the above-described resin.

(Thickness of Light Guide)

A thickness d of the light guide 20 is preferably 100 μm to 500 μm.

(Ratio of Pitch of Point Light Sources to Thickness of Light Guide)

A ratio d/P of the arrangement pitch P of the point light sources 14 to the thickness d of the light guide 20 is preferably 1:2 to 1:60 and more preferably 1:5 to 1:20.

(Configuration of Light Guide)

In the light guide 20, the light advancing direction conversion portion 30 is provided at each of positions facing the plurality of point light sources 14. The light advancing direction conversion portion 30 changes an advancing direction of light emitted from the corresponding point light source 14 to a direction in which the light component is guided in the light guide 20. That is, the light advancing direction conversion portion 30 changes the advancing direction of the light emitted from the corresponding point light source 14 such that the light spreads in an in-plane direction and propagates in the light guide 20. A form of the light advancing direction conversion portion 30 is not particularly limited as long as it has a function of changing the advancing direction of the light that is emitted from the corresponding point light source 14 and incident into the light advancing direction conversion portion 30 to the direction in which the light is guided in the light guide 20. "The direction in which the light is guided in the light guide 20" refers to a direction in which the propagating light is incident at an angle of total reflection from the incidence surface 20a or the emission surface 20b of the light guide 20.

As described above, the light advancing direction conversion portion 30 changes the advancing direction of the light so as to satisfy a condition where the light is guided while repeating total reflection from the incidence surface 20a and the emission surface 20b of the light guide 20. However, it is not necessary that the light advancing direction conversion portion 30 changes the advancing direction of the light under a condition where all the light components are guided in the light guide 20 while repeating total reflection. However, it is preferable that the light is incident into the light guide 20 under a condition where a larger amount of light is guided in the light guide 20 while repeating total reflection.

A mechanism in which the advancing direction of the light is changed by the light advancing direction conversion portion 30 may be any one of reflection, refraction, or scattering. In FIG. 1, the light advancing direction conversion portion 30 includes a concave portion that is provided on the emission surface 20b, the concave portion being a conical concave portion that has a maximum opening on the emission surface 20b and is tapered toward the point light source 14. At least a part of light incident from the point light source 14 into the light guide 20 is reflected from the side surface forming the conical concave portion, propagates in an in-plane direction in the light guide 20, and spreads in the in-plane direction. The side surface of the concave portion is not parallel to the emission surface 20b, and an angle between the side surface and the emission surface may be appropriately set such that a larger amount of light emitted from the light source is incident at a total reflection angle or more.

In addition, the light guide 20 includes a plurality of light extraction portions 40 that cause the light guided in the light guide 20 to be emitted from the emission surface 20b.

As illustrated in FIGS. 1 and 4, the light extraction portion 40 provided in the light guide 20 according to the embodiment is the concave portion. However, the light extraction portion 40 is not limited to the concave portion and may be a convex portion. In addition, the shape of the concave portion or the convex portion forming the light extraction portion 40 is not particularly limited and may be a quadrangular pyramid shape, a hemispherical shape, a conical shape, a polygonal pyramid shape, a truncated cone shape, a polygonal truncated pyramid shape, or the like. The light extraction portion 40 having a shape of the concave portion or the convex portion may be provided on only either or both of the incidence surface 20a and the emission surface 20b of the light guide 20. The shapes and sizes of the plurality of light extraction portions 40 included in one light guide 20 may be the same or may be partially different or totally different from each other.

In addition, the light extraction portion 40 may be a light scattering structure that is provided in the light guide or on the surface of the light guide. In a case where the light guide 20 has a light scattering structure, the light guided in the light guide 20 can be scattered in the light scattering structure and emitted. The light scattering structure can be prepared, for example, by arranging light scattering particles in the light guide 20 or on the surface of the light guide 20 or by providing a fine uneven structure on the surface of the light guide 20. In addition, it is preferable that a formation density of the light scattering structure is appropriately adjusted such that a balance between the amount of light spread in the in-plane direction in the light guide and the amount of light emitted from the light guide is appropriately adjusted.

In a case where the light guided in the light guide is incident into the light extraction portion 40, an advancing direction of at least a part of the light changes by reflection, refraction, scattering in the light extraction portion 40 such that the light does not satisfy the total reflection condition. Therefore, the light cannot be guided into the light guide 20 and is reflected from the incidence surface 20a or the emission surface 20b of the light guide 20. The light emitted from the incidence surface 20a side of the light guide 20 is reflected from the reflection plate 12 to be incident into the light guide 20 again and is finally emitted from the emission surface 20b.

The light extraction portion 40 may be randomly or periodically arranged on the surface of the light guide 20 or in the light guide 20. However, the density of the light extraction portions 40 in a peripheral portion 22a of the unit region 22 is set to be higher than the density thereof in a center portion 22b of the unit region 22 (refer to FIGS. 3 and 5). By making a difference in the density of the light extraction portions 40 between the peripheral portion 22a and the center portion 22b, light can be spread in the center portion 22b and can be actively emitted from the peripheral portion 22a. The difference in the density of the light extraction portions 40 refers to a difference of 1% or higher in the occupied area ratio of the light extraction portions 40 between the peripheral portion 22a and the center portion 22b. The occupied area ratio of the light extraction portion 40 refers to a ratio of the total area of the light extraction portions provided in the emission surface and the emission surface in a target region (the peripheral portion or the center portion) in a plan view to the two times of the area of the target region (that is, the area of the incidence surface+the area of the emission surface).

The density in the peripheral portion is preferably 1.05 times or more, more preferably 1.1 times or more, and still more preferably 1.5 times or more with respect to the density in the center portion.

Figure 5:
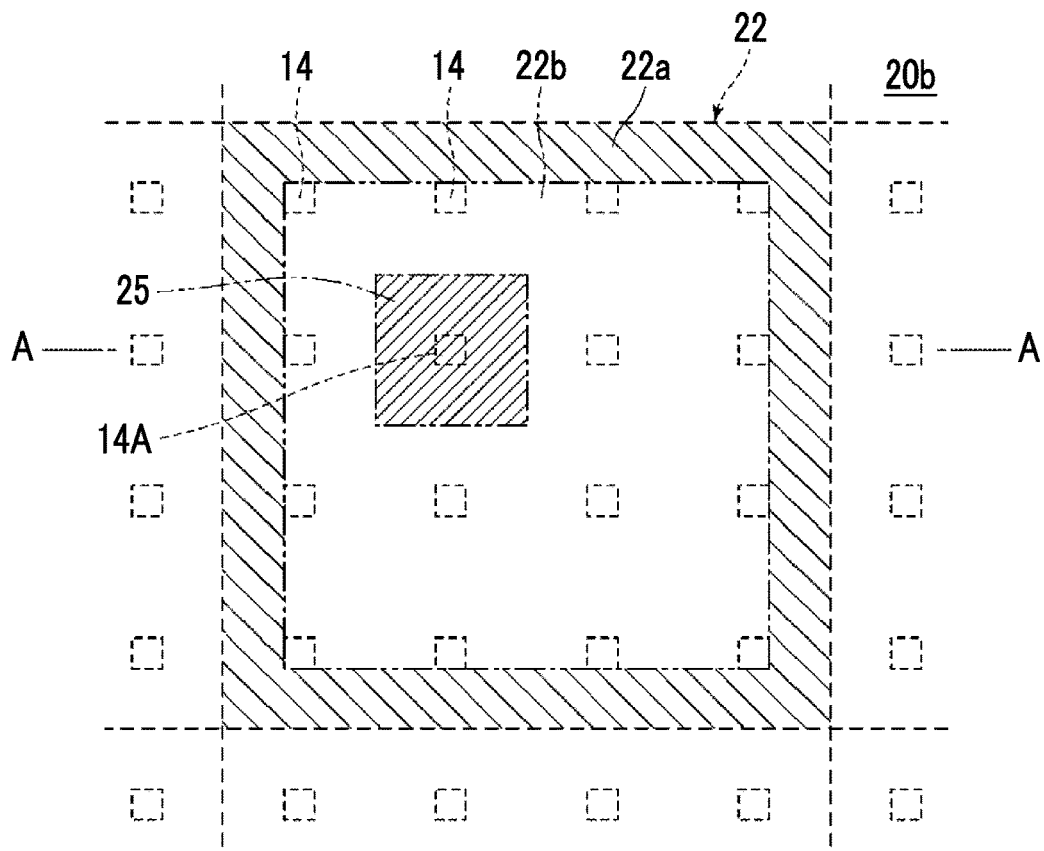
FIG. 5 is a schematic diagram illustrating a unit region.

Here, the definitions of a near-field region of the point light source, the unit region, the peripheral portion in the unit region, and the center portion in the unit region will be described with reference to FIG. 5. FIG. 5 is a plan view schematically illustrating one unit region of the emission surface 20b of the light guide 20, in which the point light source 14 that is arranged to face the incidence surface of the light guide 20 is indicated by a broken line. In FIG. 5, the light advancing direction conversion portion and the light extraction portion in the light guide 20 are not illustrated.

Assuming that each of positions (coordinates) on the emission surface belongs to a point light source having the closest distance from the position, a near-field region of the point light source is defined as a region including an aggregate of positions belonging to the target point light source. Here, the distance from each of the positions on the emission surface to the point light source refers to a straight-line distance in a plan view. In FIG. 5, a region 25 indicated by a right upward diagonal line is a near-field region 25 of a point light source 14A included in the region 25. In FIG. 5, the point light sources 14 are arranged in a lattice at the same pitch in the horizontal and vertical directions. Therefore, the near-field region of the point light source is a square. However, in a case where the point light sources 14 are arranged in a lattice but arranged at pitches that are different in the horizontal and vertical directions, the near-field region of the point light source is a region surrounded in a rectangular shape. In addition, in a case where the point light sources 14 are irregularly arranged, the shape of the near-field region may be a polygonal shape instead of a rectangular shape.

The unit region corresponding to the minimum point lighting unit is a region including a combination of the near-field regions of the point light sources forming the minimum point lighting unit. For example, in the example of FIG. 5, 16 point light sources 14 arranged in 4×4 in the horizontal and vertical directions are used as the minimum point lighting unit, and a region surrounded by a long broken line including the near-field regions of the 16 point light sources 14 is the unit region 22. In FIG. 5, the point light sources 14 are arranged in a lattice at the same pitch in the horizontal and vertical directions. Therefore, the unit region is also a square but is not limited to a square. The number and arrangement of the point light sources included in the minimum point lighting unit vary depending on the shape of the unit region.

The peripheral portion of the unit region is a peripheral region in the unit region positioned between a line surrounding a plurality of point light sources that are lighted as the minimum point lighting unit along the point light sources on the outermost side in the unit region and a boundary line between the unit region and another adjacent unit region. In the example of FIG. 5, a region indicated by a right downward diagonal line that is positioned between a chain line surrounding the outer periphery of the 16 point light sources 14 and a long broken line indicating the unit region is the peripheral portion 22a of the unit region.

The center portion of the unit region is a region inside of the peripheral portion of the unit region. In the example of FIG. 5, a region inside of the chain line surrounding the outer periphery of the 16 point light sources 14, that is, inside of the peripheral portion 22a is the center portion 22b of the unit region.

Further, in the center portion 22b of the unit region 22 of the light guide 20, the light extraction portions 40 are provided at a higher density in a region corresponding to a portion where the arrangement of the point light sources 14 is sparse than that in a region corresponding to a portion where the arrangement of the point light sources 14 is dense (refer to FIG. 3).

Whether or not the arrangement of the point light sources is dense or sparse can be determined, for example, as follows. Regarding the point light sources in one unit region 22, the distances of each of the point light sources to point light sources closest thereto are obtained, and the average value of the distances is calculated. In a case where a circle having a radius that is ½ of the average value is drawn centering on each of the point light sources, a region that is not included in any of the circles can be determined to be the region where the arrangement of the point light sources is sparse, and a region where a plurality of circles overlap each other can be determined to be the region where the arrangement of the point light sources is dense.

In a case where the point light sources 14 are arranged in a lattice at the same pitch in the horizontal and vertical directions, the distance between point light sources closest to each other at an intersection of diagonal lines of the point light sources 14 arranged in a lattice is the longest. Accordingly, in a case where the point light sources 14 are arranged in a two-dimensional lattice as in the embodiment, it is preferable that a density distribution of the light extraction portions 40 has a maximum value at an intersection of diagonal lines of the point light sources 14 in the unit region 22 of the light guide 20. The maximum value of the density distribution does not necessarily match the intersection of the diagonal lines exactly and may be in the vicinity of the intersection.

In the backlight unit 2, as described above, the light advancing direction conversion portion 30 is provided at each of the positions of the light guide 20 facing the point light sources 14. Therefore, light emitted from the point light sources 14 can be guided in the in-plane direction of the light guide 20. That is, the light can be spread in a direction away from the point light source 14 that emits the light. The light guided in the light guide 20 is emitted from the emission surface 20b after being reflected, refracted, or scattered in the light extraction portions 40 included in the light guide 20. In the unit region 22, light emitted from each of the point light sources 14 propagates over the near-field region of the point light source emitting the light, light components emitted from the plurality of point light sources 14 in the unit region 22 are mixed with each other, and the mixed light is emitted. Therefore, brightness unevenness caused by a difference between the individual point light sources 14 can be effectively suppressed.

On the other hand, in the peripheral portion 22a of the unit region 22, the light extraction portions 40 are provided at a higher density than that in the center portion 22b. Therefore, propagation of the light to another adjacent unit region 22 can be suppressed. Accordingly, the blurring of the contour of the unit region 22 during local dimming driving can be suppressed. In addition, the backlight unit 2 can output backlight having high in-plane homogeneity even during whole surface irradiation.

Figure 6:
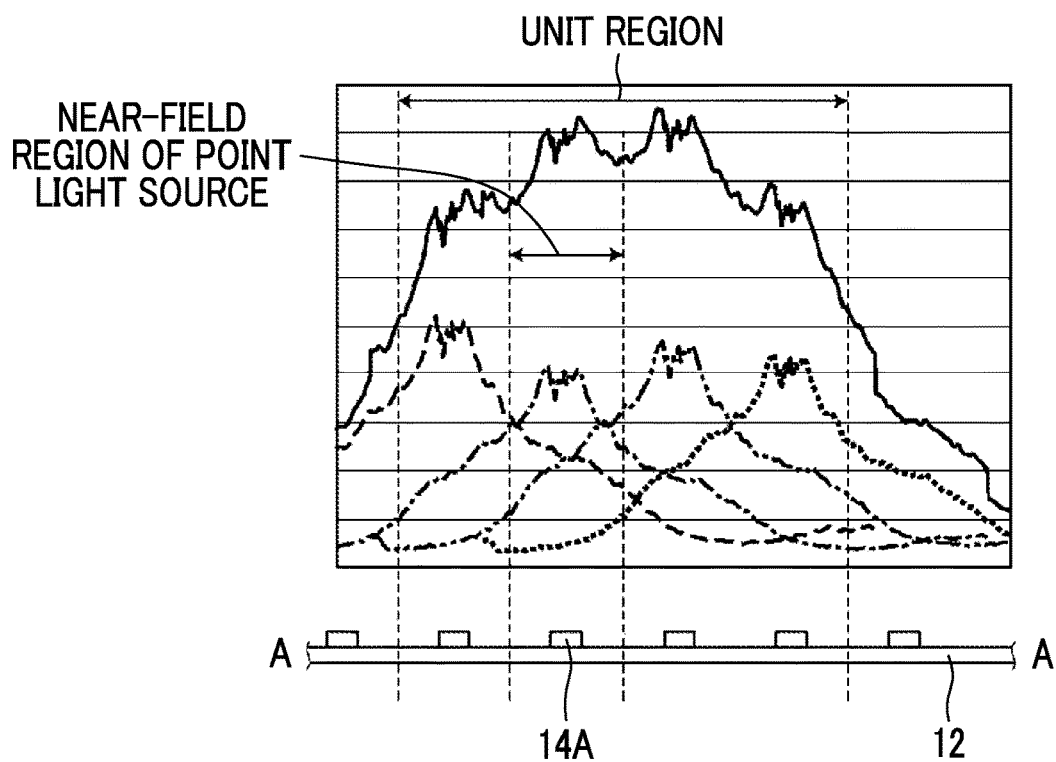
FIG. 6 is a diagram illustrating a light intensity profile in the unit region.

FIG. 6 is a diagram illustrating an example of a light intensity profile of light output from the emission surface of the light guide plate in the line A-A of FIG. 5 regarding the backlight unit 2 having the above-described configuration, the light intensity profile being obtained by a simulation. For easy understanding, the arrangement of the point light sources 14 in the line A-A direction is also illustrated. In FIG. 6, a solid line represents a light intensity profile in a case where all the light sources (here, 16) in one unit region are lighted at the same time, and each of a broken line and a chain line represents a light intensity profile in a case where only one of the point light sources is lighted.

In the backlight unit 2, it is preferable that, in a case where one point light source among the plurality of point light sources is lighted, a light extraction efficiency in the near-field region of the point light source is lower than 50%. By reducing the light extraction efficiency in the near-field region of the point light source, the amount of light guided in a wide range in the in-plane direction in the unit region can be increased, brightness inhomogeneity caused by a variation between the individual point light sources can be suppressed, and the brightness homogenization can be further improved. By adjusting the shape of the light advancing direction conversion portion 30 arranged at the position facing the point light source 14 and the density distribution of the light extraction portions 40 in the center portion 22b of each of the unit regions 22, the light extraction efficiency in the near-field region of one point light source can be controlled.

In addition, in the backlight unit 2, in a case where one point light source among the plurality of point light sources is lighted, the light extraction efficiency in the unit region including the point light source is preferably 70% or higher, more preferably 80% or higher, and still more preferably 90% or higher. By adjusting the shape of the light advancing direction conversion portion 30, the arrangement of the light extraction portions 40 in the center portion 22b of each of the unit regions 22, and the density distribution of the light extraction portions 40 in the peripheral portion 22a of each of the unit regions 22, the light extraction efficiency in the unit region can be controlled.

The in-plane brightness homogeneity of light emitted from the backlight unit 1 can be measured using a two-dimensional brightness photometer (ProMetric). In addition, by using the two-dimensional brightness meter, the light extraction efficiency in the near-field region of one point light source in a case where the point light source is lighted can be measured, and the light extraction efficiency in one unit region in a case where all the point light sources in the unit region are lighted can be measured.

The backlight unit 2 includes the above-described light guide 20. Therefore, light having a homogeneous brightness can be emitted for each of the unit regions, and emitted light having a homogeneous brightness can be obtained over the entire region. Therefore, a thick space is unnecessary between the light source portion 10 and the light guide 20. Accordingly, even a direct backlight unit can be made to be significantly thinner than that of the related art.

Since the backlight unit 2 is a direct backlight mode, multi-division local dimming corresponding to the number of point light sources included in the backlight unit 2 can be realized. However, in the present disclosure, two or more point light sources are used as the minimum unit for local dimming control, and light components emitted from the plurality of point light sources included in the unit region are mixed. As a result, the amounts of brightness unevenness caused by a difference between the individual point light sources are averaged, brightness unevenness in the unit region and between the unit regions can be effectively suppressed, and the brightness homogenization can be realized.

In addition, since the thickness of the backlight unit 2 is reduced, the thickness of the liquid crystal display device 1 as a whole can also be reduced. Further, a backlight with sufficiently high brightness homogeneity can be emitted from the backlight unit 2. Therefore, a gap between the backlight unit 2 and the liquid crystal display element 50 can also be reduced, and the thickness of the liquid crystal display device can be further reduced.

In the description of the above-described embodiment, the light advancing direction conversion portion 30 is formed of the conical concave portion provided on the emission surface 20b of the light guide 20. However, the light advancing direction conversion portion according to the embodiment of the present invention is not limited to the above-described configuration. The shape of the light advancing direction conversion portion is not limited to the conical concave portion may be concave portion having a hemispherical shape or a polygonal pyramid shape.

Figure 9:
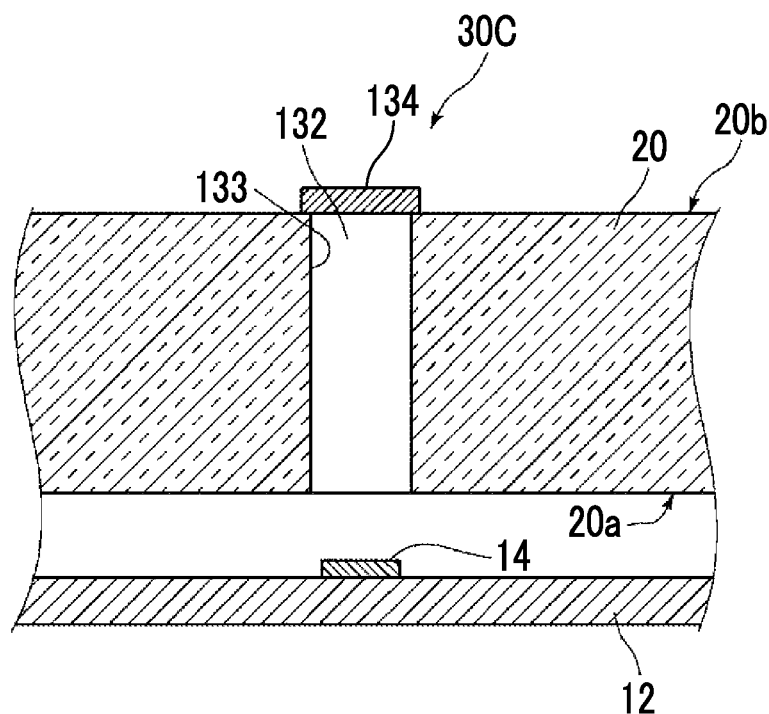
FIG. 9 is an enlarged schematic diagram illustrating a light advancing direction conversion portion according to a third aspect and a point light source.
Figure 10:
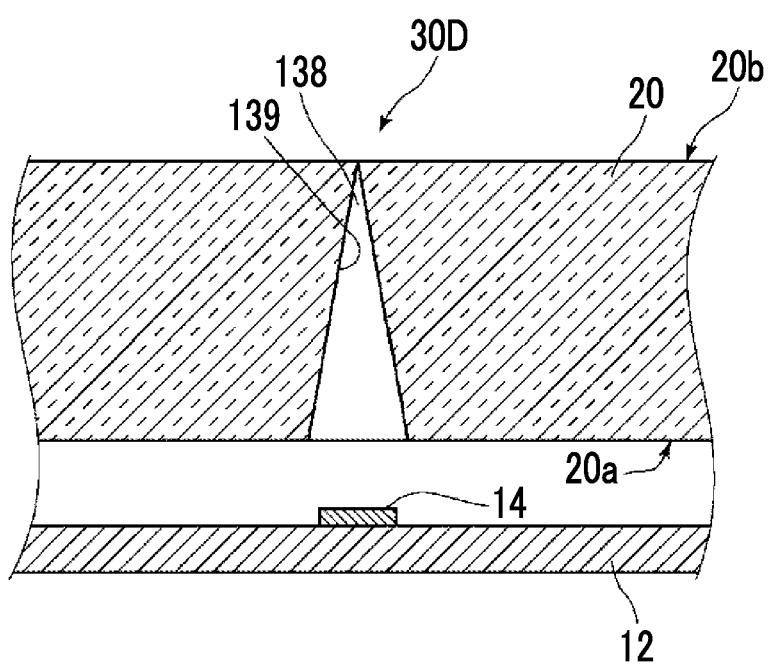
FIG. 10 is an enlarged schematic diagram illustrating a light advancing direction conversion portion according to a fourth aspect and a point light source.

Hereinafter, other aspects of the light advancing direction conversion portion will be described with reference to FIGS. 7 to 10. Each of FIGS. 7 to 10 is an enlarged schematic diagram illustrating a part of the backlight unit, in which one point light source 14 and a region of the light guide 20 including one light advancing direction conversion portion arranged to face the point light source 14 are illustrated. In each of FIGS. 7 and 8, the upper side A illustrates a cross-sectional view, and the lower side B illustrates a plan view in a case where the backlight unit is seen from the emission surface side of the light guide plate. FIGS. 9 and 10 are cross-sectional views.

Figure 7:
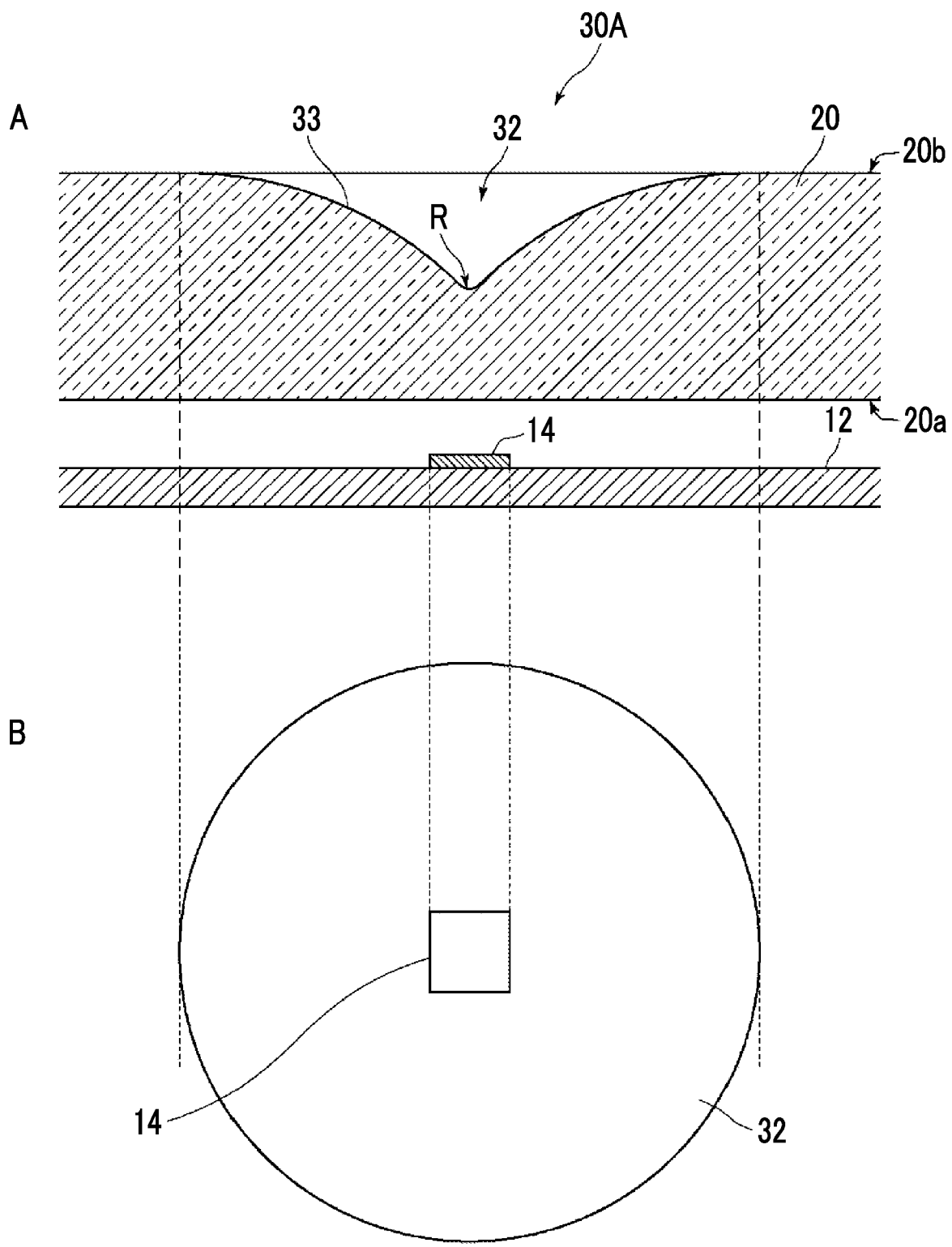
FIG. 7 is an enlarged schematic diagram illustrating a light advancing direction conversion portion according to a first aspect and a point light source.

In a first aspect illustrated in FIG. 7, a light advancing direction conversion portion 30a is formed of a concave portion 32 provided on the emission surface 20b of the light guide 20. The concave portion 32 has a shape that gradually spreads in a direction away from the point light source 14, and a surface 33 forming the concave portion 32 is an inclined surface (hereinafter, referred to as "inclined surface 33") having an inclination with respect to the emission surface 20b of the light guide 20. The light emitted from the point light source 14 is incident from the incidence surface 20a into the light guide 20 and is incident into the inclined surface 33 of the concave portion 32. The light advancing direction conversion portion 30A according to the embodiment can guide the light incident into the inclined surface 33 at an incidence angle of a total reflection angle or more such that the light is totally reflected from the inclined surface 33 such that an advancing direction of the light is changed, and the totally reflected light spreads in an in-plane direction in the light guide 20. The inclined surface 33 is set as a surface into which most of light incident from the point light source 14 is incident at a total reflection angle or more.

Figure 8:
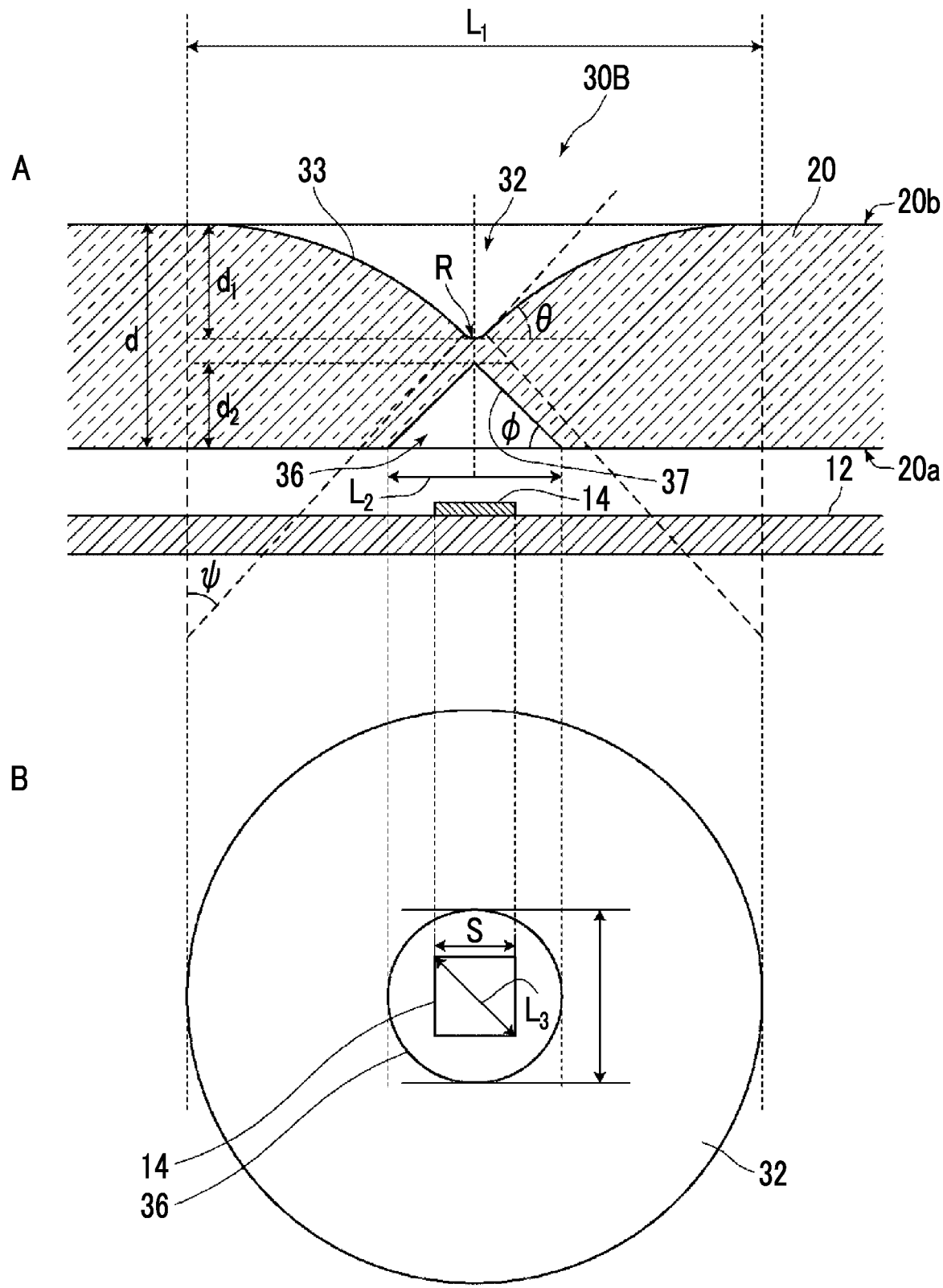
FIG. 8 is an enlarged schematic diagram illustrating a light advancing direction conversion portion according to a second aspect and a point light source.

In a second aspect illustrated in FIG. 8, a light advancing direction conversion portion 30B includes not only the concave portion 32 according to the first aspect but also a second concave portion 36 that is provided on the incidence surface 20a of the light guide 20 facing the point light source 14. By providing the second concave portion 36, in a case where light emitted from the point light source is incident into the light guide 20, the light can be refracted by the second concave portion 36, and an effect of further spreading the incidence light in a plane direction can be obtained. This way, by causing the light to be incident into the concave portion 32 provided on the emission surface 20b of the light guide 20 in a state where the light is spread in the plane direction by the second concave portion 36 on the incidence surface 20a side of the light guide 20, the amount of light incident into the center (the deepest portion) of the concave portion 32 can be reduced. This way, light leak from the center of the concave portion 32, that is, the amount of light directly emitted from the center of the concave portion 32 can be reduced. Therefore, the brightness homogenization can be realized.

It is preferable that the shape of the concave portion 32 provided in the light advancing direction conversion portions 30A and 30B according to the first and second aspects is axisymmetric with respect to a rotation axis that is a straight line perpendicular to the emission surface from the point light source 14. In the examples of FIGS. 7 and 8, in a case where the above-described concave portion is seen from a direction perpendicular to the emission surface, the shape (projected shape in a plan view) thereof is a circular shape. However, the shape of the concave portion is not limited to a circular shape and may be any shape such as a regular polygonal shape or a star shape. However, from the viewpoint of isotropically guiding the emission of the point light source 14, it is preferable that the projected shape of the concave portion in a plan view is a circular shape. It is preferable that, in a parallel plate-shaped light guide that does not include the concave portion 32 and has a flat surface, the concave portion 32 is provided in a region where an angle of incident from the point light source into the emission surface of the light guide does not satisfy the total reflection angle.

As illustrated in FIG. 8, in a case where the diameter of a circular opening in the emission surface 20b of the concave portion 32 is represented by $L_1$, the thickness of the light guide 20 is represented by d, the total reflection angle of the light guide 20 is represented by $\theta_c$, and the length of a diagonal line of the point light source is represented by $L_3$, it is preferable that the following expression is satisfied.

$$(d \times \tan \theta_c) \times 2 + L_3 < L_1 \qquad \text{Expression I}$$

By providing a concave portion having a sufficient size that satisfies Expression I, the emission of a larger number of light sources can be spread in a plane direction.

It is more preferable that the following expression is satisfied.

$$L_1 < (d \times \tan \theta_c) \times 3 + L_3 \qquad \text{Expression II}$$

By providing a concave portion having a size that satisfies Expression II, the processing of the light guide 20 can be suppressed to the minimum.

The concave portion 32 has a shape in which the opening size spreads in a direction away from the point light source 14, that is, has a shape that has a maximum opening size on the emission surface 20b and is tapered toward the point light source 14.

It is preferable that the angle θ between the inclined surface 33 forming the concave portion 32 and the emission surface 20b is the maximum in a region immediately above the point light source 14 and decreases in a direction away from the point light source.

From the viewpoint of reducing the light leak from the concave portion 32 and guiding a larger amount of light in a plane direction, the angle θ between the inclined surface 33 and the emission surface 20b is preferably 40° or more. In addition, from the viewpoint of easy processing, the angle θ is preferably 50° or more and more preferably 42° to 45°.

It is preferable that center of the concave portion 32 positioned immediately above the point light source 14 is sharp. On the other hand, due to processing restrictions, the center of the concave portion 32 may be rounded. In this case, in order to suppress light leak from the center of the concave portion, the curvature radius R of the center portion is preferably 100 μm or less and more preferably 20 μm or less. In addition, an angle ψ shown in FIG. 8 is preferably 45° or more.

In a case where the second concave portion 36 is provided on the incidence surface 20a of the light guide 20 as in the second aspect, the second concave portion 36 may have any size but preferably has a conical or quadrangular pyramid shape. In FIG. 8, the second concave portion 36 has a conical shape. In a case where the diameter of a bottom surface of the cone, that is, diameter of a circular opening in the incidence surface 20a of the second concave portion 36 is represented by $L_2$, and the length of one side of the point light source having a square shape is represented by S, it is preferable that the following expression is satisfied.

$$S \times \sqrt{2} \times 1.5 \leq L_2 \qquad \text{Expression III}$$

In addition, an angle φ between a conical side surface 37 forming the second concave portion 36 and the bottom surface is preferably 45° or more.

In a case where the concave portion is provided in each of the emission surface 20b and the incidence surface 20a as illustrated in FIG. 8, a depth $d_1$ of the concave portion 32 on the emission surface 20b side is preferably 40% to 60% with respect to the thickness d of the light guide 20, and a depth $d_2$ of the concave portion 36 on the incidence surface 20a side is preferably 10% to 30% with respect to the thickness d of the light guide 20.

In a third aspect illustrated in FIG. 9, a light advancing direction conversion portion 30C includes: a through hole 132 that penetrates the light advancing direction conversion portion 30C from the incidence surface 20a to the emission surface 20b of the light guide 20; and a light reflection member 134 that is arranged on the emission surface 20b side of the through hole 132. A side surface 133 forming the through hole 132 is not parallel to the emission surface 20b of the light guide 20. Here, the through hole 132 functions as a light incidence portion that guides light incident into the side surface 133 of the through hole 132 into the light guide 20 by refraction or reflection. The light reflection member 134 suppresses the light emitted from the point light source 14 from passing through the through hole 132 and being emitted from the emission surface side as it ts.

The light emitted from the point light source 14 and incident from the side surface 133 of the through hole 132 into the light guide is refracted in the side surface 133 such that an advancing direction of the light changes. At this time, among the light components that is refracted in the side surface 133 to be incident into the light guide 20, a light component that is incident into the emission surface 20b or the incidence surface 20a of the light guide 20 at an incidence angle of a total reflection angle or more is guided in an in-plane direction in the light guide 20 while repeating total reflection.

In addition, light that is emitted from the point light source 14 and passes through the through hole 132 is reflected from the side surface 133 or the reflection plate 12 side in the light reflection member 134. In order to secure a given brightness in a region immediately above the point light source 14, it is preferable that the light reflection member 134 allows transmission of a part of light incident into the light reflection member 134. Accordingly, it is preferable that a member that reflects 50% or higher of the light and allows transmission of at least higher than 0% of the light is used as the light reflection member 134.

The through hole 132 may be filled with a low refractive index material. However, in order to allow most of the light emitted from the point light source 14 to be incident into and guided to the light guide 20, it is preferable that a difference in refractive index between the low refractive index material and the light guide 20 is large. Accordingly, it is also preferable that the through hole 132 is a gap filled with air.

In addition, the side surface 133 of the through hole 132 may be treated for antireflection. The antireflection treatment may include a treatment of laminating of thin layers having a specific refractive index and a specific thickness or a treatment of providing a moth-eye structure on a surface. By performing the antireflection treatment, a larger amount of light emitted from the point light source 14 can be allowed to be incident into the light guide 20.

The opening of the through hole 132 is more than or equal to the size of the point light source 14 and can embrace the point light source 14 in a plan view.

In an aspect illustrated in FIG. 9, the diameter of the through hole 132 is uniform in a range from the incidence surface 20a to the emission surface 20b. However, the diameter may vary in a range from the incidence surface 20a to the emission surface 20b. In this case, the diameter may gradually change, for example, may increase or decrease from the incidence surface 20a toward the emission surface 20b.

Instead of the light reflection member 134, a light absorption member may be provided. As the light absorption member, a member that absorbs 50% or higher of the light and allows transmission of at least higher than 0% of the light may be used. In addition, instead of the light reflection member 134, a diffusion member that diffuses incidence light may be provided.

In a fourth aspect illustrated in FIG. 10 a light advancing direction conversion portion 30D is formed of a conical concave portion 138 having an opening on the incidence surface 20a side of the light guide 20. The conical concave portion 138 functions as a light incidence portion that guides light incident into a side surface 139 forming the concave portion into the light guide 20 by refraction or reflection.

The opening of the conical concave portion 138 is a portion corresponding to the bottom surface of the cone, and the opening and the point light source 14 are arranged to face each other. The opening size is preferably equal to or more than the size of the point light source 14.

A part of the light emitted from the point light source 14 is incident into and refracted on the side surface 139 of the conical concave portion 138 forming the light advancing direction conversion portion 30D and is guided into the light guide 20. An angle between the emission surface 20b and the side surface 139 is adjusted such that the refracted light is guided in the light guide 20 while repeating total reflection.

In any of the aspects, the light that is guided in the in-plane direction due to the action of the light advancing direction conversion portions 30A to 30C and is finally emitted from the emission surface of the light guide 20 due to the action of the light extraction portions.

The light guide including the light advancing direction conversion portions and the light extraction portions can be prepared, for example, by imprinting using a mold. In addition, the light guide can be prepared by forming the concave portion or the through hole on the front and back surfaces of the flat light guide by mechanical machining or laser irradiation.

In the above-described embodiment, the backlight unit only one light guide but may include a laminate including a plurality of light guides. In addition, in a case where the backlight unit includes a plurality of light guides, it is preferable that an air layer is provided by providing a gap between the light guides.

The backlight unit according to the present disclosure can be also used not only as the backlight unit in the above-described liquid crystal display device but also as a backlight unit of a signboard, a sign, or the like or an interior lamp or the like.

The disclosure of Japanese Patent Application No. 2018-003380 filed on Jan. 12, 2018 is incorporated herein in its entirety.

All publications, patent applications, and technical standards mentioned in this specification are herein incorporated by reference to the same extent as if each individual publication, patent application, or technical standard was specifically and individually indicated to be incorporated by reference.

What is claimed is:

1. A backlight unit comprising:
   a light guide that includes an incidence surface and an emission surface facing each other; and
   a light source portion including a plurality of point light sources that are two-dimensionally arranged to face the incidence surface of the light guide,
   wherein light emitted from the light source portion is incident into the incidence surface of the light guide and emitted from the emission surface,
   the backlight unit is driven by local dimming in which two or more point light sources among the plurality of point light sources are used as a minimum point lighting unit,
   the light guide includes a plurality of light advancing direction conversion portions and a plurality of light extraction portions,
   each of the light advancing direction conversion portions is provided at each of positions on the incidence surface facing the plurality of point light sources and changes an advancing direction of each of light components to a direction in which the light component is guided in the light guide, and
   each of the light extraction portions is provided per unit region corresponding to the minimum point lighting unit in a state where a density in a peripheral portion of the unit region is set to be higher than a density in a center portion of the unit region and emits the light guided in the light guide.

2. The backlight unit according to claim 1,
   wherein in a case where one point light source among the plurality of point light sources is lighted, a light extraction efficiency in a near-field region of the point light source is lower than 50%.

3. The backlight unit according to claim 1,
   wherein in a case where one point light source among the plurality of point light sources is lighted, a light extraction efficiency in the unit region including the point light source is 70% or higher.

4. The backlight unit according to claim 1,
   wherein in the center portion of the unit region of the light guide, the light extraction portions are provided at a higher density in a region corresponding to a portion where the arrangement of the point light sources is sparse than that in a region corresponding to a portion where the arrangement of the point light sources is dense.

5. The backlight unit according to claim 1,
   wherein the plurality of point light sources are arranged in the unit region in a two-dimensional lattice.

6. The backlight unit according to claim 5,
wherein a density distribution of the light extraction portions has a maximum value at an intersection of diagonal lines of the plurality of point light sources arranged in the two-dimensional lattice in the center portion of the unit region of the light guide.

7. The backlight unit according to claim 1,
wherein the light advancing direction conversion portion includes a concave portion having a surface that is not parallel to the emission surface.

8. The backlight unit according to claim 7,
wherein the concave portion is provided on the emission surface, and
the concave portion has a shape that has a wide opening on the emission surface and is tapered toward the point light source facing the concave portion.

9. The backlight unit according to claim 1,
the light advancing direction conversion portion includes a through hole that penetrates the light advancing direction conversion portion from the incidence surface to the emission surface and a light reflection member, a light diffusion member, or a light absorption member that is arranged on the emission surface side of the through hole.

10. A liquid crystal display device comprising:
a liquid crystal display element; and
the backlight unit according to claim 1.

* * * * *